(12) United States Patent
Blackford et al.

(10) Patent No.: US 10,875,274 B2
(45) Date of Patent: Dec. 29, 2020

(54) COOLING MATERIAL

(71) Applicant: Columbia Sportswear North America, Inc., Portland, OR (US)

(72) Inventors: Michael E. "Woody" Blackford, Portland, OR (US); Wayne Alan Skankey, Portland, OR (US); Jeffrey Thomas Mergy, Portland, OR (US); Craig Gates, Portland, OR (US)

(73) Assignee: Columbia Sportswear North America, Inc., Portland, OR (US)

( * ) Notice: Subject to any disclaimer, the term of this patent is extended or adjusted under 35 U.S.C. 154(b) by 488 days.

(21) Appl. No.: 14/677,911

(22) Filed: Apr. 2, 2015

(65) Prior Publication Data

US 2015/0210032 A1 Jul. 30, 2015

Related U.S. Application Data

(63) Continuation-in-part of application No. 13/689,449, filed on Nov. 29, 2012, now Pat. No. 9,062,913.
(Continued)

(51) Int. Cl.
*B32B 3/10* (2006.01)
*B32B 27/12* (2006.01)
(Continued)

(52) U.S. Cl.
CPC ............ *B32B 3/10* (2013.01); *A41D 13/0053* (2013.01); *B32B 7/02* (2013.01); *B32B 27/12* (2013.01);
(Continued)

(58) Field of Classification Search
CPC .. A41D 13/0056; A41D 13/0053–0056; Y10T 428/24802–424934; Y10T 428/2481–24818
(Continued)

(56) References Cited

U.S. PATENT DOCUMENTS 3,049,896 A 8/1962 Webb
3,577,305 A 5/1971 Hines et al.
(Continued)

FOREIGN PATENT DOCUMENTS

EP 1894482 5/2008
JP 2005-343093 12/2005
(Continued)

OTHER PUBLICATIONS

Cheremisinoff et al. "Handbook of Applied Polymer Processing Technology" Jan. 23, 1996 by CRC Press. p. 171. (Year: 1996).*
(Continued)

*Primary Examiner* — Marla D McConnell
*Assistant Examiner* — Kevin Worrell
(74) *Attorney, Agent, or Firm* — Schwabe, Williamson & Wyatt, P.C.

(57) ABSTRACT

Disclosed are cooling materials for clothing and other body gear that may use a discontinuous pattern of highly absorbent polymers coupled to a base fabric that has a low resistance to moisture spread (e.g., a high wicking rate) and lower absorption properties compared to the highly absorbent polymer elements, to manage moisture (e.g., sweat) and body heat. The absorbance of the highly absorbent polymers is greater than that of the base fabric, such as at least two times greater, and the highly absorbent polymer elements may be non-endothermic.

18 Claims, 6 Drawing Sheets

Related U.S. Application Data

(60) Provisional application No. 61/974,010, filed on Apr. 2, 2014, provisional application No. 61/564,726, filed on Nov. 29, 2011.

(51) Int. Cl.

| | | |
|---|---|---|
| *D06N 7/00* | (2006.01) |
| *B32B 7/02* | (2019.01) |
| *A41D 13/005* | (2006.01) |
| *D05B 1/00* | (2006.01) |
| *B32B 27/30* | (2006.01) |
| *B32B 27/34* | (2006.01) |
| *B32B 27/40* | (2006.01) |

(52) U.S. Cl.
CPC ............ *B32B 27/308* (2013.01); *B32B 27/34* (2013.01); *B32B 27/40* (2013.01); *D05B 1/00* (2013.01); *D06N 7/0092* (2013.01); *B32B 2250/02* (2013.01); *B32B 2262/0261* (2013.01); *B32B 2262/0276* (2013.01); *B32B 2262/062* (2013.01); *B32B 2262/08* (2013.01); *B32B 2307/724* (2013.01); *B32B 2307/726* (2013.01); *B32B 2307/728* (2013.01); *B32B 2437/00* (2013.01); *D10B 2401/022* (2013.01); *D10B 2501/00* (2013.01); *Y10T 428/2481* (2015.01)

(58) Field of Classification Search
USPC .................... 442/118, 301; 428/196–197
See application file for complete search history.

(56) References Cited

U.S. PATENT DOCUMENTS

| | | | |
|---|---|---|---|
| 4,420,521 A | 12/1983 | Carr | |
| 4,427,557 A * | 1/1984 | Stockburger | C08G 63/6886 252/8.62 |
| 4,525,406 A | 6/1985 | Pollok | |
| 6,185,742 B1 | 2/2001 | Doherty | |
| 6,269,654 B1 | 8/2001 | Murray et al. | |
| 6,698,510 B2 | 3/2004 | Serra et al. | |
| 6,802,081 B1 | 10/2004 | Ogino et al. | |
| 7,028,344 B2 | 4/2006 | Toth | |
| 7,465,490 B2 | 12/2008 | Blucher | |
| 7,842,625 B1 | 11/2010 | Stockton et al. | |
| 8,048,371 B1 | 11/2011 | Kapur et al. | |
| 8,424,119 B2 | 4/2013 | Blackford | |
| 2003/0139291 A1* | 7/2003 | Qin | A61L 15/18 502/402 |
| 2003/0208831 A1* | 11/2003 | Lazar | A41D 13/0053 2/69 |
| 2006/0241356 A1 | 10/2006 | Flaherty | |
| 2007/0163027 A1 | 7/2007 | Hamilton | |
| 2008/0057809 A1* | 3/2008 | Rock | A41D 31/0038 442/64 |
| 2009/0192751 A1 | 7/2009 | Kamath et al. | |
| 2010/0099960 A1 | 4/2010 | Caduff et al. | |
| 2010/0282433 A1 | 11/2010 | Blackford | |
| 2012/0015155 A1 | 1/2012 | Blackford et al. | |
| 2012/0190259 A1 | 7/2012 | Frost | |

FOREIGN PATENT DOCUMENTS

| | | |
|---|---|---|
| JP | 2008-057100 | 3/2008 |
| JP | 2009-185420 | 8/2009 |
| JP | 2009-185420 A1 | 8/2009 |
| RU | EA005018 | 10/2004 |
| TW | M346608 | 8/1997 |
| TW | M393308 | 12/2010 |
| WO | 02/059414 | 2/2003 |
| WO | 2006-014338 | 2/2006 |
| WO | 2006-020213 | 2/2006 |
| WO | 2009-042012 A1 | 4/2009 |
| WO | 2010-109347 A1 | 9/2010 |
| WO | 2010-129923 | 11/2010 |
| WO | 2010-129923 A1 | 11/2010 |
| WO | 2012-136962 | 10/2012 |
| WO | 2013-044108 A1 | 3/2013 |

OTHER PUBLICATIONS

Prodduturi et al. "Water Vapor Sorption of Hot-Melt Extruded Hydroxypropyl Cellulose Films: Effect on Physico-Mechanical Properties, Release Characteristics, and Stability." Journal of Pharmaceutical Sciences, vol. 93, No. 12, Dec. 2004. (Year: 2004).*

Crouter et al. "The Effect of Moisture on the Flowability of Pharmaceutical Excipients" AAPS PharmSciTech, vol. 15, No. 1, Feb. 2014 (Copyright 2013). DOI: 10.1208/s12249-013-0036-0 (Year: 2014).*

* cited by examiner

COOLING MATERIAL

CROSS REFERENCE TO RELATED APPLICATIONS

The present application claims priority to U.S. Provisional Patent Application No. 61/974,010, filed Apr. 2, 2014, entitled "COOLING MATERIAL," the disclosure of which is hereby incorporated by reference in its entirety for all purposes, except those sections, if any, that are inconsistent with this specification. The present application is also a Continuation-in-Part of and claims priority to U.S. application Ser. No. 13/689,449, filed Nov. 29, 2012, entitled "COOLING FABRICS," which in turn claims priority to U.S. Provisional Patent Application No. 61/564,726, filed Nov. 29, 2011, entitled "COOLING FABRICS," the specifications of which are hereby incorporated by reference in their entirety for all purposes, except those sections, if any, that are inconsistent with this specification.

TECHNICAL FIELD

Embodiments of the present disclosure relate generally to fabrics used for apparel having enhanced cooling properties, and in particular to fabrics that utilize absorbent polymer elements coupled to a wicking base fabric to enhance cooling.

BACKGROUND

Performance fabric materials such as wicking materials and cooling materials typically take the form of uniform layers that are woven into or otherwise incorporated into the interior of a garment. Cooling fabrics that incorporate a layer of cooling materials such as highly absorbent polymers have shortcomings, particularly when incorporated into the fabric as a continuous layer. For example, a uniform layer of polymer material may impede the transfer of moisture vapor or restrict air passage through the fabric. Furthermore, such cooling materials may impede a desired characteristic of the base fabric, such as drape, texture, stretch, and the like. Thus, the use of a layer of cooling material may impede the breathability (or another function) of the underlying base fabric.

BRIEF DESCRIPTION OF THE DRAWINGS

Embodiments of the present disclosure will be readily understood by the following detailed description in conjunction with the accompanying drawings. Embodiments are illustrated by way of example and not by way of limitation in the figures of the accompanying drawings.

DETAILED DESCRIPTION OF EMBODIMENTS

Figure 1A:
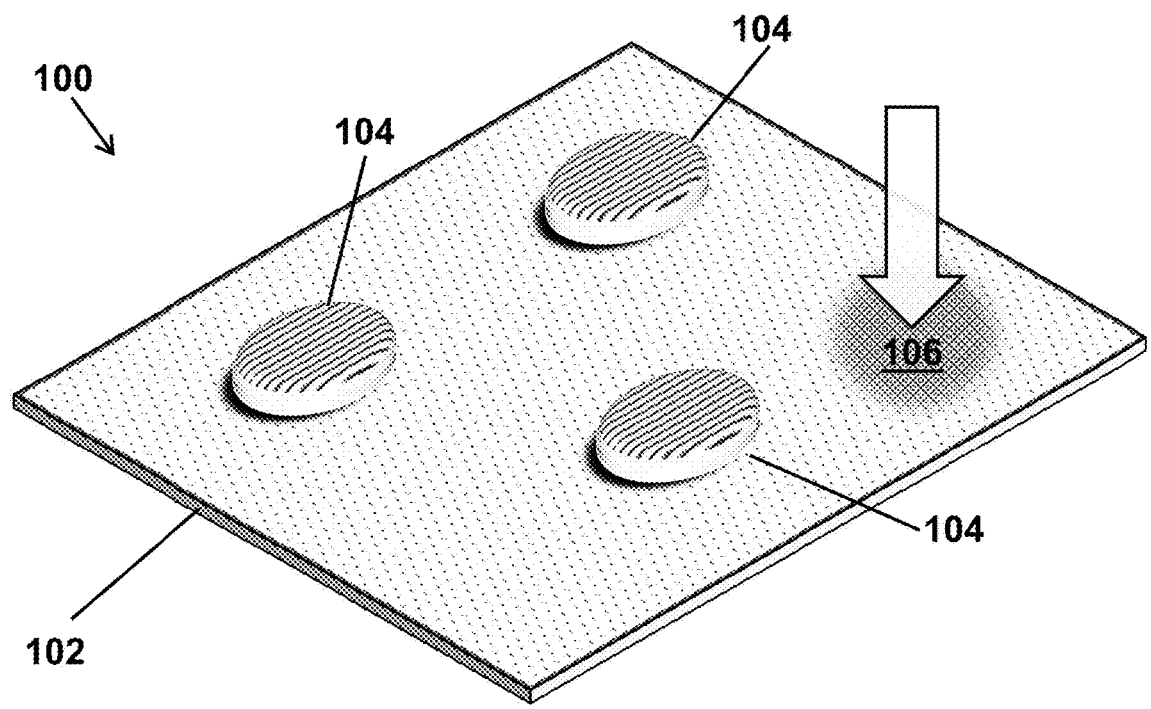
FIGS. 1A-1D show several perspective views of one example of a cooling material having a base fabric with a high moisture wicking rate and a discontinuous pattern of highly absorbent polymer elements disposed thereon, including a view of moisture contacting one portion of the base fabric (FIG. 1A), a view of the base fabric dispersing the moisture over a large surface area via a wicking action (FIG. 1B), a view of the highly absorbent polymer elements absorbing moisture from the base fabric (FIG. 1C), and a view of the moisture evaporating from the absorbent polymer elements (FIG. 1D), in accordance with various embodiments.

In the following detailed description, reference is made to the accompanying drawings which form a part hereof, and in which are shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scopes of embodiments, in accordance with the present disclosure, are defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

In various embodiments, cooling materials for clothing and other body gear are disclosed that may use a discontinuous pattern (whether interconnected or having independent elements) of highly absorbent polymer elements coupled to a body-facing surface of a base fabric that has a low resistance to moisture spread (e.g., a high wicking rate). In various embodiments, the highly absorbent polymers may leave portions of the base fabric exposed, for example, areas of the base fabric may be left uncovered between or among the highly absorbent polymer elements. Additionally, the highly absorbent polymer elements may be significantly more absorbent than the base fabric, such as two, three, four, five, or even ten or more times more absorbent. In various embodiments, the cooling materials may be used to manage moisture (e.g., sweat) and body heat.

In various embodiments, when the cooling material is exposed to moisture, the base fabric may quickly wick the moisture away from the skin. The moisture may then be dispersed through/along the base fabric over a wide surface area via a wicking action, and the highly absorbent polymer elements may begin absorbing moisture, both from the base fabric and directly from the skin. In various embodiments, this process may cause a redistribution of moisture, first from a localized area of the base fabric to a larger area of the base fabric, and then from the base fabric into the highly absorbent polymer elements.

Thus, in various embodiments, by spreading the moisture over a large surface area of the base fabric, and by drawing the moisture from the base fabric into the highly absorbent polymer elements, evaporation from the base fabric may be facilitated, which may accelerate the evaporative cooling experienced by the wearer. Additionally, in various embodiments, once the highly absorbent polymer elements have absorbed moisture from the base fabric, they may retain the moisture close to the skin surface and produce a prolonged evaporative cooling sensation for the user, for example when compared to that produced by the base fabric alone. In various embodiments, the highly absorbent polymer elements, and the uncovered portions of base fabric therebetween, may permit the base fabric to retain certain desired characteristics, such as stretch, drape, breathability, moisture vapor transfer, air permeability, and/or wicking.

For the purposes of the present description, the term "discontinuous pattern of highly absorbent polymer elements" includes an ordered or disordered pattern of independent elements, a matrix of interconnected elements, or a hybrid of both, with portions of the base fabric left exposed and uncovered by the elements between or amongst the discontinuous pattern. As used herein, the term "absorbance" refers to the ability of a fiber or a polymer to absorb moisture, for example by diffusion. Absorbance typically is expressed as a percentage of weight of the starting material. By contrast, as used herein, the term "wicking" or "wickability" refers to the movement of bulk fluid along or between fibers, for example in a fabric or other textile. As such, a fabric or other textile may have both a high wicking rate and low absorbance.

As used herein, the term "endothermic" as applied to a process refers to a process in which the system absorbs energy from its surroundings in the form of heat. As applied to a fabric or composition, the term "endothermic" as used herein refers to a fabric or composition that absorbs heat from its surroundings, for instance upon a change of state or upon absorbing water or other fluids. For an endothermic reaction, $\Delta H$ (the change in enthalpy) is greater than zero.

FIGS. 1A-1D show several perspective views of one example of a cooling material having a base fabric with a high moisture wicking rate and a discontinuous pattern of highly absorbent polymer elements disposed thereon, including a view of moisture contacting one portion of the body-facing side of the base fabric (FIG. 1A), a view of the base fabric dispersing the moisture over a large surface area via a wicking action (FIG. 1B), a view of the highly absorbent polymer elements absorbing moisture from the base fabric (FIG. 1C), and a view of the moisture evaporating from the absorbent polymer elements through the base fabric and away from the body (FIG. 1D), in accordance with various embodiments. In various embodiments, a cooling material 100 may include a plurality of highly absorbent polymer elements 104 disposed on a base fabric.

Thus, in various embodiments, the base fabric 102 may have a high moisture wicking rate and a low absorbance compared to the absorbance of the highly absorbent polymer elements 104. Wicking rate may be measured using any of a variety of tests known to those of skill in the art. For instance, one measure involves determining the distance a fixed volume of moisture spreads from an emanation point when dropped onto the surface of a fabric. Generally, the greater the distance the moisture travels from the emanation point, the stronger the "wickability" of the fabric. Other suitable tests of wicking rate include the Vertical Wick Test (e.g., AATCC 197) and the moisture management test (MMT). As defined herein, a fabric having a "high wicking rate" wicks at least three inches in ten minutes as measured using the Vertical Wick Test (AATCC 197).

Absorbance is also easily determined in a laboratory setting. In various embodiments, for example, when measured with a moisture sorption balance at 30° C. and 80% relative humidity, the base fabric 102 may absorb about 0-2.0% of its weight in moisture, such as about 0.25-1.5%, about 0.5-1.0%, or about 0.8%. In various embodiments, by contrast, when measured with a moisture sorption balance at 30° C. and 80% relative humidity, the highly absorbent polymer elements 104 may absorb about 3.0-20% of their weight in moisture, such as about 3.3%, about 5.0%, or about 10%. In some embodiments, the highly absorbent polymer elements 104 may absorb even more moisture, such as about 50% or even 100% of their weight in water.

In various embodiments, the highly absorbent polymer elements 104 may be several fold more absorbent than the base fabric 102, such as about 2×, 3×4×5×, 10×, 20×, 50×, 100×, 200×, or even 300× (or more) as absorbent than the base fabric 102. For example, in one specific, non-limiting example, the highly absorbent polymer elements 104 may absorb about 3.3% moisture by weight as measured under the conditions listed above, whereas the base fabric 102 may absorb only about 0.8% moisture by weight, making for about a four-fold difference in absorbance between the base fabric 102 and the highly absorbent polymer elements 104. Without being bound by theory, it is believed that this absorbance differential between the base fabric 102 and the highly absorbent polymer elements 104 pulls moisture from the base fabric 102 into the highly absorbent polymer elements 104, thus enhancing evaporative cooling and creating a sensation of dryness in the base fabric 102.

In various embodiments, the highly absorbent polymer elements 104 may be disposed in a generally discontinuous array or pattern, whereby some of the base fabric 102 may be exposed within or between adjacent highly absorbent polymer elements 104. In various embodiments, the highly absorbent polymer elements 104 may be arranged in an array of separate elements, whereas in other embodiments, discussed at greater length below, the highly absorbent polymer elements 104 may be arranged in an interconnected pattern. In some embodiments, a highly absorbent polymer element may take the form of a solid shape or closed loop member, such as a circle, square, hexagon, or other shape. In other embodiments, the discontinuous pattern of highly absorbent polymer elements 104 may take the form of a lattice, grid, or other interconnected pattern.

Figure 1B:
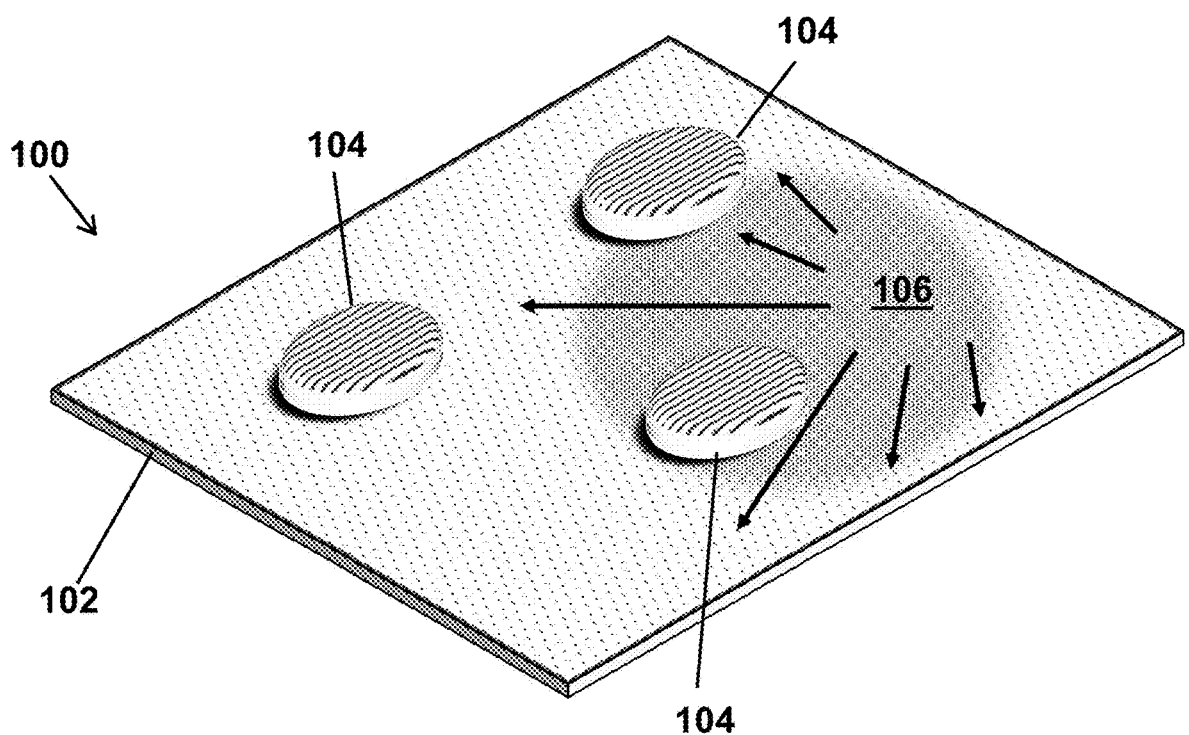

As illustrated in FIGS. 1A and 1B, the highly absorbent polymer elements 104 are positioned on the surface of the base fabric 102 facing the wearer's skin, and as moisture 106 contacts the base fabric 102 (FIG. 1A) (for instance, in the form of sweat from the skin of the wearer), it begins to spread and disperse laterally through the base fabric 102 (FIG. 1B) due to the base fabric's high moisture wicking rate and low resistance to moisture spread. In some embodiments, the base fabric 102 may be treated with a hydrophilic compound in order to increase its moisture wicking rate or a hydrophobic compound to assist in movement of moisture in a desired direction. The base fabric's lower absorbance (compared to that of the highly absorbent polymer elements 104) also permits the moisture to travel freely within the cooling material 100.

Figure 1C:
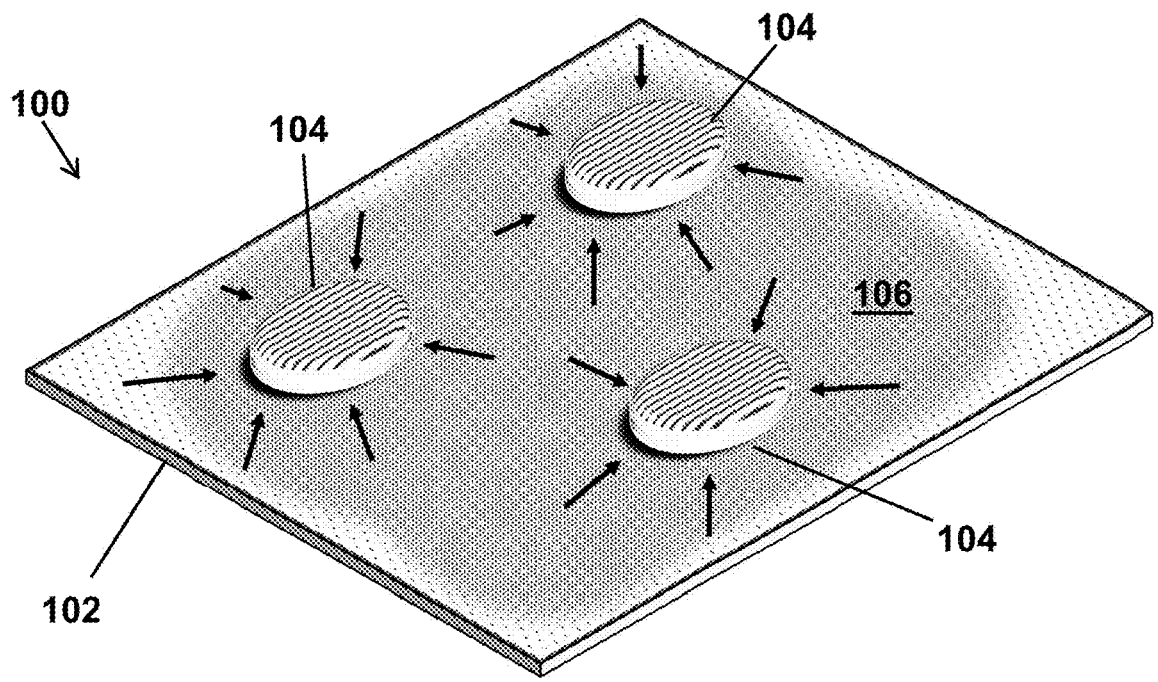

As illustrated in FIG. 1C, moisture may then contact the highly absorbent polymer elements 104 and may begin to be absorbed, enhancing evaporative cooling through the base fabric 102 and creating a sensation of dryness for the user. For example, in some embodiments, the highly absorbent polymer elements 104 pull moisture from the surrounding base fabric 102, causing accelerated evaporation and allowing the base fabric 102 to dry quickly, for example more quickly than base fabric 102 dries without highly absorbent polymer elements 104. During this process, the highly absorbent polymer elements 104 absorb moisture from the base fabric 102, and this redistribution of the moisture is facilitated both by the absorbance properties of the highly absorbent polymer elements 104 and the base fabric's low resistance to moisture spread and lower absorbance when compared to the highly absorbent polymer elements 104. This redistribution of the moisture from the base fabric 102 to the highly absorbent polymer elements 104 accelerates evaporative cooling from the base fabric 102 (and thereby the skin of the user), and also prepares the cooling material 100 for more prolonged cooling.

In various embodiments, moisture may have a higher equilibrium concentration in the highly absorbent polymer elements 104 than it has in the base fabric 102. Without being bound by theory, it is believed that this difference in absorbance levels may create a concentration gradient within the cooling material 100 as the highly absorbent polymer elements 104 absorb moisture from the base fabric 102. In various embodiments, the moisture concentration gradient drives moisture out of the base fabric 102 and into the highly absorbent polymer elements 104. As the highly absorbent polymer elements 104 absorb moisture from the base fabric 102, the base fabric 102 is then capable of absorbing more moisture, such as perspiration from the body.

Figure 1D:
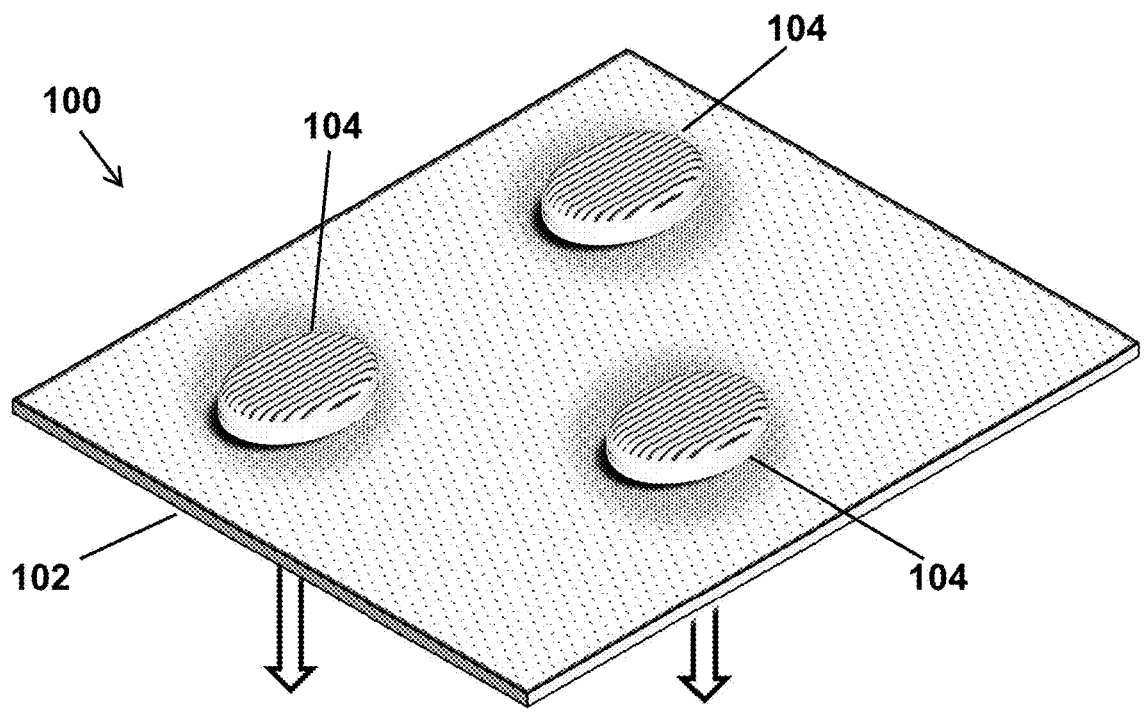
Figure 2A:
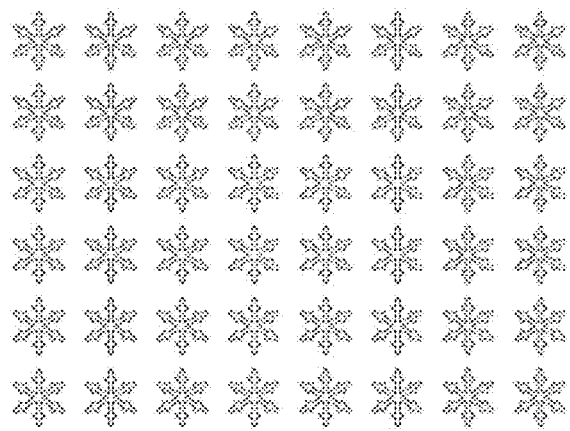
FIGS. 2A-2H illustrate a variety of specific, non-limiting examples of patterns of individual highly absorbent polymer elements in accordance with various embodiments.
Figure 2B:
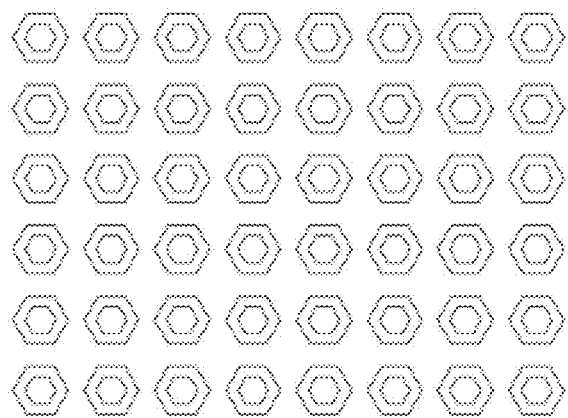
Figure 2C:
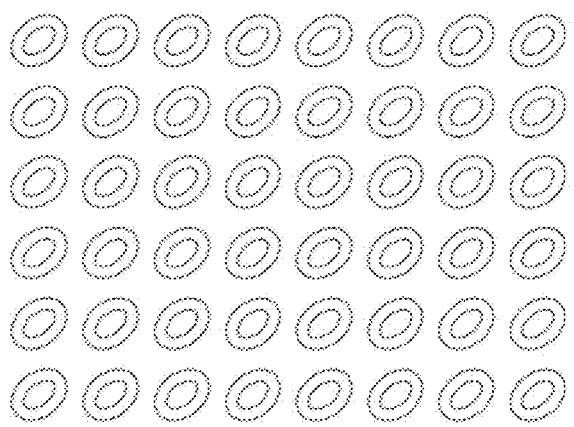
Figure 2D:
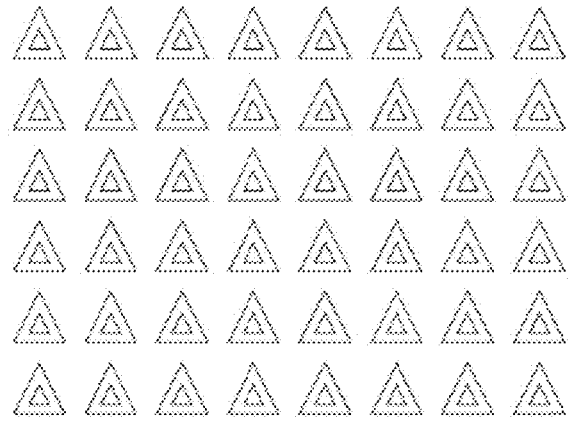
Figure 2E:
Figure 2F:
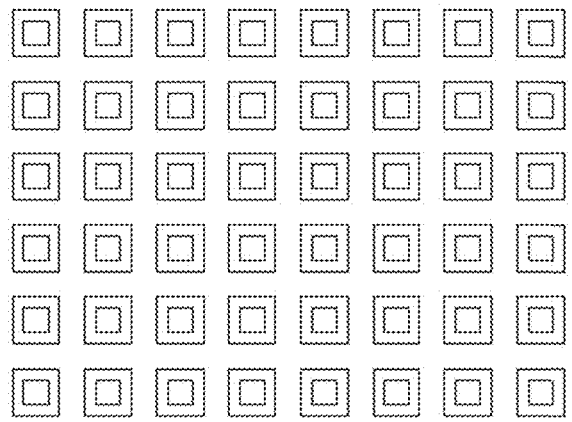
Figure 2G:
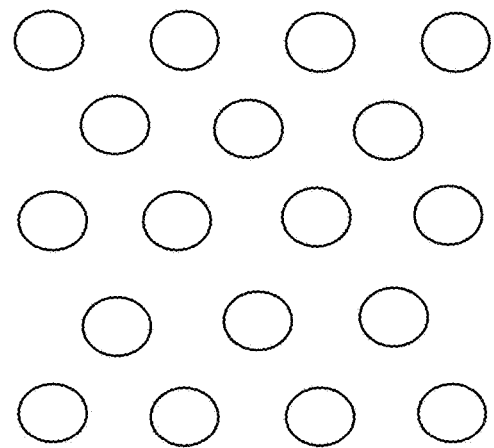
Figure 2H:
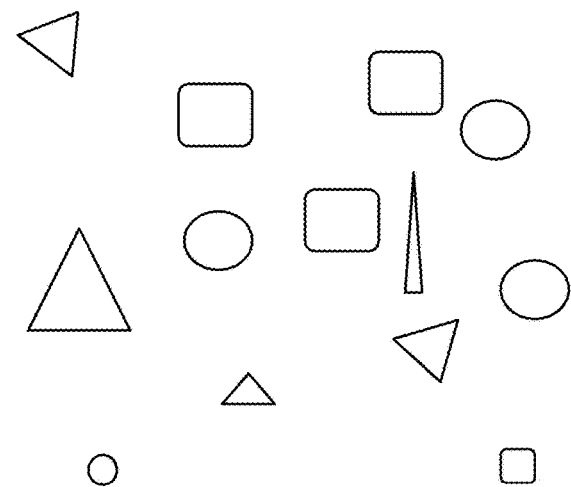
Figure 3A:
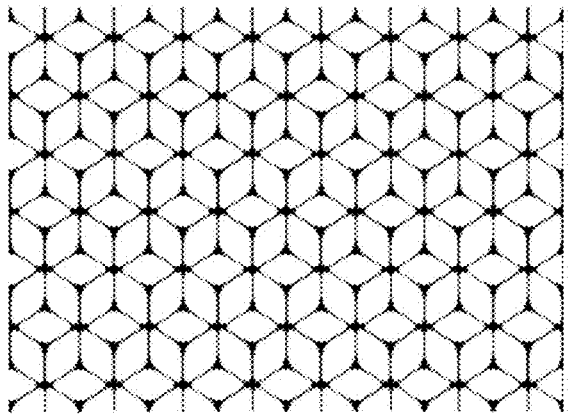
FIGS. 3A-3F illustrate a variety of specific, non-limiting examples of patterns of interconnected highly absorbent polymer elements, in accordance with various embodiments.
Figure 3B:
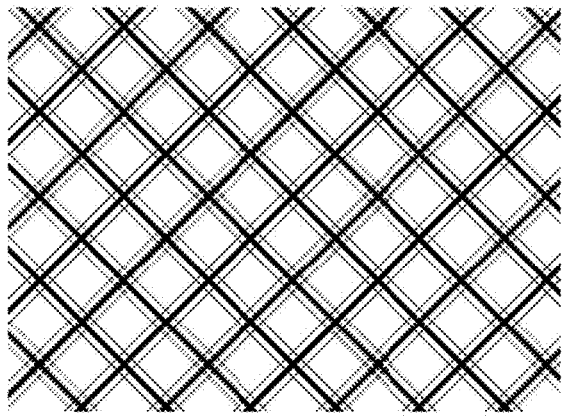
Figure 3C:
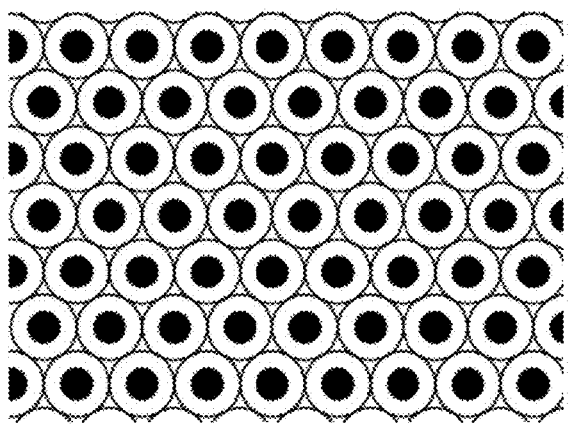
Figure 3D:
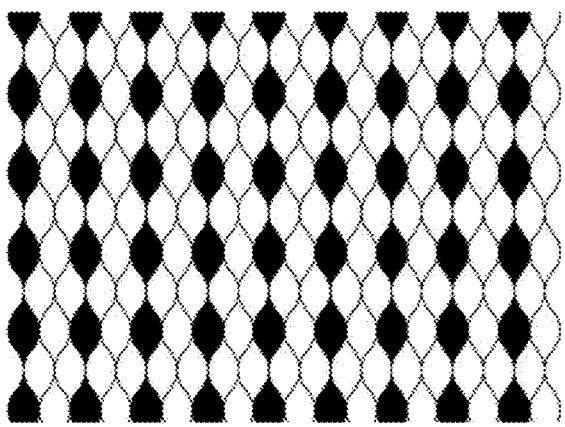
Figure 3E:
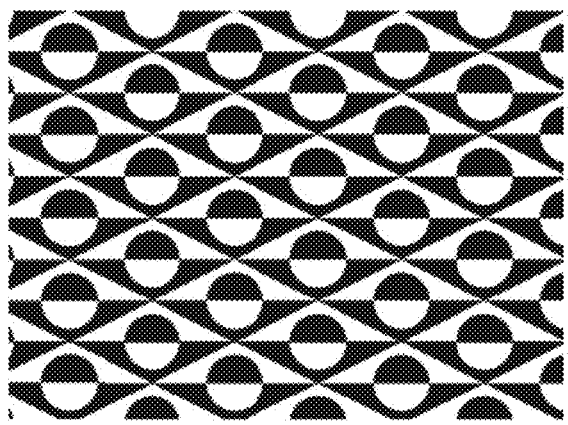
Figure 3F:
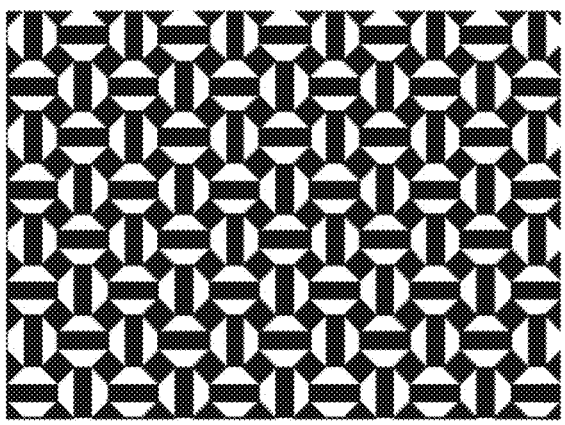

As illustrated in FIG. 1D, moisture retained in the highly absorbent polymer elements 104 causes prolonged evaporation, pulling moisture in a direction away from the skin of the wearer (see arrows) until the cooling material 100 returns to a dry state, in accordance with various embodiments. During this phase of cooling, the base fabric 102 may be largely dry, and most of the cooling function of the cooling material 100 may be provided by evaporation from the highly absorbent polymer elements 104 during the prolonged cooling phase. In various embodiments, positioning the highly absorbent polymer elements 104 against (or next to) the skin of the wearer may help the wearer to experience a sensation of prolonged evaporative cooling. For example, evaporation from the highly absorbent polymer elements 104 causes a reduction in the temperature of the cooling elements 104 in much the same way that evaporation from the skin surface cools the skin. Thus, in various embodiments, positioning the cooler highly absorbent polymer elements 104 on the body-facing surface of the base fabric 102 allows the wearer to perceive this cooling sensation, whereas the cooling sensation may be less noticeable if the highly absorbent polymer elements 104 were positioned on the outward-facing surface of the base fabric 102. In some embodiments, the cooling fabrics disclosed herein may provide a cooling phase, defined as the period of cooling resulting from evaporation of a particular quantity of liquid/sweat, that lasts 110%, 120%, 150%, 200% (or even more) as long as the cooling phase provided by the base fabric alone.

Prior to the present disclosure, it was widely believed that positioning the cooling elements on the outward-facing surface of the base fabric 102 would produce a superior cooling effect, as this arrangement allows for evaporation from the highly absorbent polymer elements 104 to proceed unencumbered by the base fabric 102. However, as disclosed herein, it has now been found that positioning the highly absorbent polymer elements 104 on the body-facing surface of the base fabric 102 enhances the coolness sensation perceived by the wearer, while still allowing moisture to evaporate and a steady rate through the base fabric 102.

As described below in greater detail, the highly absorbent polymer elements 104 may include one or more hygroscopic polymers, such as a polymer that may absorb and retain a liquid, and in some examples, may absorb extremely large amounts of a liquid relative to its mass. Hygroscopic polymers that absorb large amounts of liquids are referred to as superabsorbent polymers. Such water absorbing polymers, which are classified as hydrogels when cross-linked, absorb aqueous solutions through hydrogen bonding with water molecules. A superabsorbent polymer's ability to absorb water generally is a factor of the ionic concentration of the aqueous solution. For instance, in deionized and distilled water, a superabsorbent polymer may absorb 500 times its weight (for example, from 30-60 times its own volume) and can become up to 99.9% liquid, but when put into a 0.9% saline solution, the absorbency drops to approximately 50 times its weight.

In various embodiments, the total absorbance and swelling capacity may be controlled by the type and degree of cross-linkers used to make the gel. Low density cross-linked superabsorbent polymers generally have a higher absorbent capacity and swell to a larger degree. These types of superabsorbent polymers also have a softer and more sticky gel formation. High cross-link density polymers exhibit lower absorbent capacity and swell, but the gel strength is firmer and can maintain particle shape even under modest pressure.

Superabsorbent polymers are commonly made from the polymerization of acrylic acid blended with sodium hydroxide in the presence of an initiator to form a poly-acrylic acid sodium salt (e.g., sodium polyacrylate). Other materials also may be used to make a superabsorbent polymer, such as polyacrylamide copolymer, ethylene maleic anhydride copolymer, cross-linked carboxymethylcellulose, polyvinyl alcohol copolymers, cross-linked polyethylene oxide, and starch grafted copolymer of polyacrylonitrile (PAN). In other embodiments, the polymers may be a homopolymer, and may include polysaccharides, polyurethanes, polyamides, polyacrylates, and the like.

In specific embodiments, a highly absorbent polymer element may include, for example, any suitable natural or synthetic polymeric material that, in a dry form, is capable of absorbing and storing many times its weight in water. Specific, non-limiting examples of natural gums that may be used in highly absorbent polymer elements include xanthan, agar, pectin, locust bean gum, hydroxypropyl guar gum, polyglucomannan gum, cationic guar gum, anionic guar gum, alginate, irish moss, and gum arabic. Specific, non-limiting examples of cellulosics that may be used in highly absorbent polymer elements include methyl cellulose, ethyl cellulose, carboxymethyl cellulose, carboxy ethyl cellulose, hydroxyethyl cellulose, hydroxymethyl cellulose, and hydroxypropylcellulose.

Specific, non-limiting examples of synthetic hydrogel polymers that may be used in highly absorbent polymer elements include suitable crosslinked, water-swellable acrylic copolymers. In particular embodiments, the synthetic hydrogel polymers may include, without limitation, copolymers that include repeat units from one or more monomers selected from (meth)acrylic acid, maleic acid, 2-(meth)acrylamido-2-methyl propane sulfonic acid, styrene sulfonate, vinyl sulfonic acid, and their corresponding ammonia, amine and alkali metal salts, (meth)acrylamide, vinyl alcohol, vinyl acetate, maleic anhydride, alkyl vinyl ethers, vinylmorpholinone, vinylpyrridine, vinyl pyrrolidone, and acrylonitrile; and one or more crosslinking agents selected from N,N'-methylenebis(meth)acrylamide, (poly)ethylene glycol di(meth)acrylate, (poly)propylene glycol di(meth)acrylate, trimethylolpropane tri(meth)acrylate, glycerol tri(meth)acrylate, glycerol acrylate methacrylate, ethylene-oxide-modified trimethylolpropane tri(meth)acrylate, pentaerythritol tetra(meth)acrylate, dipentaerythritol hexa(meth)acrylate, triallyl cyanurate, triallyl isocyanurate, triallyl phosphate, triallylamine, poly(meth)allyloxyalkanes, (poly)ethylene glycol diglycidyl ether, glycerol diglycidyl ether, ethylene glycol, polyethylene glycol, propylene glycol, glycerol, pentaerythritol, ethylenediamine, ethylene carbonate, propylene carbonate, polyethylenimine, glycidyl (meth)acrylate, diallyl sucrose, triallyl sucrose triallyl amine, and triallyl methyl ammonium chloride. Other specific examples of cooling polymers may include paraffin ($C_nH_{2n}{}^{2+}$), fatty acids ($CH_3(CH_2)_{2n}COOH$), salt hydrates ($M_nH_2O$), hygroscopic materials, trimethylolethane, and lauric acid. In particular embodiments, the highly absorbent polymer elements may include polyacrylate and/or sodium polyacrylate mixed or cross-linked with a non-soluble compound, such as polyurethane.

Other specific, non-limiting examples include styrenic block copolymers, which are thermoplastic elastomers that may include at least three blocks, for instance two hard polystyrene end blocks and one soft, elastomeric (e.g., polybutadiene, polyisoprene, or their hydrogenated equivalents) midblock. In various embodiments, the hard and soft blocks may be immiscible, so that, on a microscopic scale, the polystyrene blocks form separate domains in the rubber matrix, thereby providing physical cross links to the rubber.

Additional highly absorbent polymers and methods to manufacture such polymers are described, without limitation, in U.S. Pat. Nos. 6,469,080, 6,399,668, 6,127,454, 6,087,002, 5,244,735, 4,925,603, and 4,734,478. Additional non-limiting examples of highly absorbent polymers that may be used in accordance with various embodiments include those available under the trade names ALCOSORB® from Ciba Specialty Chemicals, Chatanooga, Tenn.; DRYTECH® from the Dow Chemical Company, Midland, Mich.; NORSOCRYL® and AQUAKEEP® from Atofina, Paris, France; HYDROSORB™ from HYDROSORB Inc., Orange, Calif.; AQUALIC CA® from Nippon, Shokubai Co., Ltd., Osaka, Japan; and PERMAX™ from The Lubrizol Corporation, Wickliffe, Ohio.

In various embodiments, the highly absorbent polymer elements 104 may cover a sufficient surface area of the base fabric 102 to achieve the desired degree of cooling, for example, having a surface coverage area of the highly absorbent polymer elements 104 of about 5-50%, about 10-40%, about 15-30%, or about 20% in various embodiments. This coverage range leaves about 50-95%, about 60-90%, about 70-85%, or about 80% of the base fabric 102 uncovered in various embodiments. Generally, a sufficient area of base fabric 102 should be exposed to provide the desired base fabric function (e.g., stretch, drape, texture, breathability, moisture vapor transfer, air permeability, and/or wicking). For example, if there is too little exposed base fabric, properties such as moisture vapor transfer and/or permeability may suffer greatly, and even disproportionately to the percentage of coverage. As used herein, the term "surface coverage area" refers to a measurement taken from seam to seam on a given garment, and does not necessarily correspond to the percentage of the entire garment covered by the highly absorbent polymer elements.

In accordance with various embodiments, the base fabric 102 may be a part of any form of clothing or bodywear, which term is used herein to include anything worn on or used close to the body, including, but not limited to, athletic wear such as compression garments, t-shirts, shorts, tights, sleeves, headbands and the like, outerwear such as jackets, pants, scarves, shirts, hats, gloves, mittens, and the like, footwear such as shoes, boots, slippers, and the like, sleepwear, such as pajamas, nightgowns, and robes, undergarments such as underwear, thermal underwear, undershirts, brassieres, socks, hosiery, and the like, and other items used close to the body, such as bedding, towels, backpacks, and the like.

In various embodiments, the highly absorbent polymer elements 104 may be disposed on a base fabric 102 having one or more desired properties or characteristics. For example, the underlying base fabric 102 may have properties such as air permeability, moisture vapor transfer, and/or wickability, which are common needs for bodywear used in both indoor and outdoor applications. In some embodiments, the underlying base fabric 102 may have other desirable attributes, such as abrasion resistance, anti-static properties, anti-microbial activity, water repellence, flame repellence, hydrophilicity, hydrophobicity, wind resistance, UV protection, resiliency, stain resistance, wrinkle resistance, and the like. In some embodiments, the areas of uncovered base fabric 102 between and/or inside highly absorbent polymer elements 104 may help allow the base fabric 102 to have a desired drape, look, stretch, and/or texture. Specific examples of suitable base fabrics 102 may include nylon, polyester, rayon, cotton, spandex, wool, silk, or a blend thereof, or any other material having a desired look, feel, weight, thickness, weave, texture, or other desired property. One example for a suitable base fabric 102 is a fabric made from polyester fiber, although any fabric having suitable properties, such as high wickability and very low absorbance may be used. As used herein, the term "low absorbance" when used with reference to a fabric, refers to a fabric having fibers that absorb less than 1.0% moisture by weight when measured at 80% relative humidity and 30° C.

In various embodiments, configuring the cooling material to allow a designated percentage of the base fabric 102 to remain uncovered by the highly absorbent polymer elements 104 may allow that portion of the base fabric 102 to perform the desired functions, while still leaving enough surface area of highly absorbent polymer elements 104 to cool the body to a desired degree. In various embodiments, single-layer bodywear may be used, and may be comprised of a single layer of the base fabric 102, whereas other embodiments may use multiple layers of fabric, including, for example, one or more additional layers of the base fabric or another fabric. For instance, the base fabric 102 may be used as a fabric lining for bodywear.

In various embodiments, the highly absorbent polymer elements 104 may be attached to a lower or innermost surface of the base fabric 102 (e.g., an innermost surface of the body gear, facing the skin), placing the highly absorbent polymer elements 104 in a good position for absorbing moisture directly from the skin of a user when in contact with the skin, as well as from the base fabric 102. However, in some embodiments, the highly absorbent polymer elements 104 may be at least partially integrated into or may at least partially permeate base fabric 102, so long as they still face the body of a user.

In various embodiments, the highly absorbent polymer elements 104 may have little or no endothermicity. Endothermicity is measured using Differential scanning calorimetry (DSC), which is a technique that monitors heat effects associated with phase transitions and chemical reactions as a function of temperature. In a DSC, the difference in heat flow to the sample and a reference at the same temperature is recorded as a function of temperature. The reference is an inert material such as alumina, or just an empty aluminum pan. The temperature of both the sample and reference are increased at a constant rate. Since the DSC is at constant pressure, heat flow is equivalent to enthalpy changes, and can be either positive or negative. In an endothermic process, such as most phase transitions, heat is absorbed and, therefore, heat flow to the sample is higher than that to the reference. Hence ΔdH/dt is positive. In various embodiments, the absorbance of water by certain materials, including certain superabsorbent polymers, is an endothermic process. Prior to the present disclosure, it was believed that the endothermic properties of certain materials, such as cooling polymers and phase change materials, caused the bulk of the cooling sensation perceived by a user of a cooling fabric incorporating these materials. Thus, prior to the present disclosure, polymers deemed suitable for use in cooling fabrics typically had at least some endothermic properties.

Surprisingly, as disclosed herein, it has now been found that endothermic properties are not necessary or desirable properties for a cooling polymer, as evaporative cooling provides the bulk of the cooling effect that is perceived by a user when the highly absorbent elements are positioned on the body-facing surface of the base fabric. Additionally, endothermic materials can be costly and may have other undesirable characteristics relating to durability and texture. As such, in various embodiments, a highly absorbent polymer for use in the disclosed cooling fabrics may have no endothermic properties. As defined herein, a "non-endothermic" polymer is defined herein to include any polymer having an enthalpy of less than 10 $Jg^{-1}$ as measured by DSC.

In various embodiments, the highly absorbent polymer elements 104 may be permanently coupled to the base fabric 102 in a variety of ways, including, but not limited to gluing, heat pressing, printing, or stitching. In some embodiments, the cooling elements may be coupled to the base fabric by frequency welding, such as by radio or ultrasonic welding. In some embodiments, the highly absorbent polymer elements 104 may be coupled to the base fabric using gravure coating. In some specific, non-limiting examples, the gravure coating process may use an engraved roller running in a coating bath, which fills the engraved dots or lines of the roller with the coating material (e.g., the gel making up the cooling elements). The excess coating on the roller may be wiped off using a blade, and the coating may then be deposited onto the substrate (e.g., the base fabric) as it passes between the engraved roller and a pressure roller. In various embodiments, the gravure coating process may include direct gravure, reverse gravure, or differential offset gravure, and in various embodiments, the coat weight may be controlled by the percent of solids, the gravure volume, the pattern depth, and/or the speed of the gravure cylinder.

In various embodiments, the highly absorbent polymer elements may be applied in a pattern or a continuous or discontinuous array. For example, as illustrated in FIGS. 2A-2H, the highly absorbent polymer elements may take the form of an array of discrete solid or closed loop members, adhered or otherwise secured to the base fabric in a desired pattern. Such a configuration has been found to provide cooling to the user while still allowing the base fabric to perform desired properties (e.g., breathe and stretch). In various embodiments, such discontinuous, discrete, separate cooling elements may take the form of circles, triangles, squares, pentagons, hexagons, octagons, stars, crosses, crescents, ovals, or any other solid shape or a substantially closed loop member that includes a center portion inside the closed loop member wherein the base fabric remains exposed.

Although the embodiments illustrated in FIGS. 2A-2H show the highly absorbent polymer elements as separate, discrete elements, in some alternate embodiments, some or all of cooling elements may be arranged such that they are in connection with one another, such as stripes or a matrix/lattice pattern or any other pattern that permits partial coverage of the base fabric. For example, as illustrated in FIGS. 3A-3F, the configuration of cooling elements disposed on a base fabric may be in the form of a variety of partially or completely, and the pattern may combine both discontinuous elements (such as those illustrated in FIGS. 2A-2H) and interconnected geometrical patterns (such as those illustrated in FIGS. 3A-3F). In various embodiments, the pattern of highly absorbent polymer elements may be symmetrical, ordered, random, and/or asymmetrical. Further, as discussed below, the pattern of highly absorbent polymer elements may be disposed on the base fabric at strategic locations to improve the performance of the bodywear. In various embodiments, the size and/or spacing of the highly absorbent polymer elements may also be varied in different areas of the bodywear to balance the need for enhanced cooling properties and preserve the functionality of the base fabric.

In various embodiments, the placement, pattern, and/or coverage ratio of the cooling elements may vary. For example the cooling elements may be concentrated in certain areas where cooling may be more critical (e.g., the body core) and non existent or extremely limited in other areas where the function of the base fabric property is more critical. In various embodiments, different areas of the bodywear may have different coverage ratios, e.g. 30% at the chest and 5% at the limbs, in order to help optimize, for example, the need for cooling and breathability.

In various embodiments, the size of the highly absorbent polymer elements may be largest (or the spacing between them may be the smallest) in the core regions of the body for enhanced cooling in those areas, and the size of the highly absorbent polymer elements may be the smallest (or the spacing between them may be the largest) in peripheral areas of the body. In some embodiments, the degree of coverage by the highly absorbent polymer elements may vary in a gradual fashion over the entire garment as needed for regional cooling.

EXAMPLES

Example 1

Figure 4A:
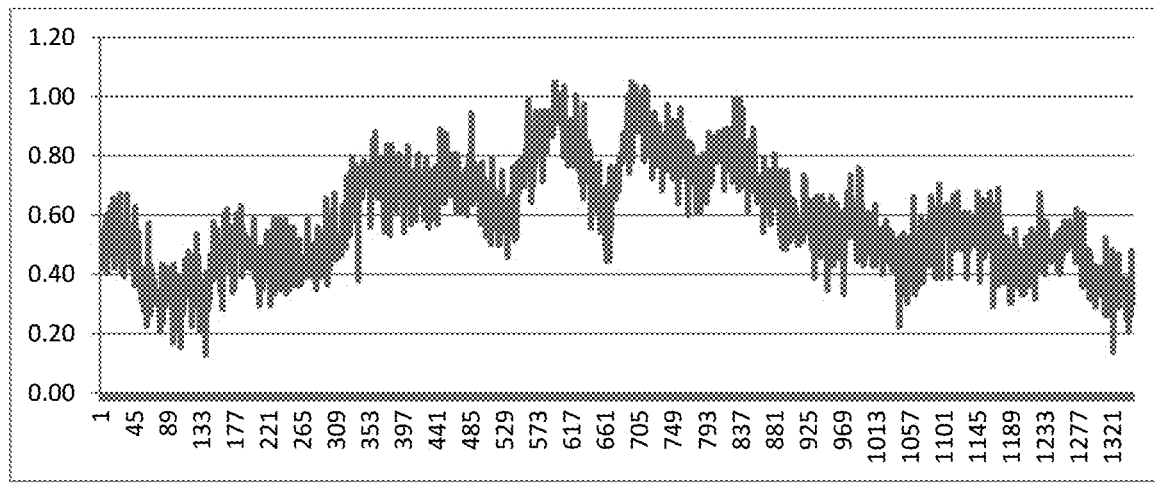
FIG. 4A and FIG. 4B show a comparison of the efficacy of a control cooling polymer fabric (FIG. 4A) versus a new cooling material (FIG. 4B) having a base fabric with a high moisture wicking rate, and a highly absorbent polymer element disposed thereon, in accordance with various embodiments.
Figure 4B:
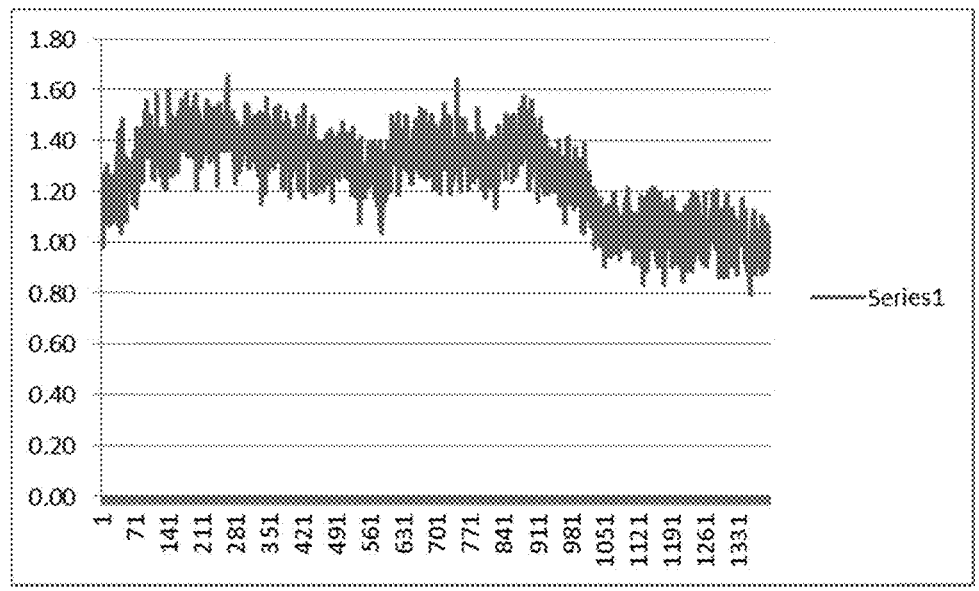

This example illustrates a comparison of the heat-managing properties of an existing cooling polymer fabric (Omni Freeze Zero™) with a new cooling material that has a discontinuous pattern of highly absorbent polymers coupled to a base fabric that has a low resistance to moisture spread. The temperature of both fabrics was measured after having moisture added using a steamer. FIG. 4A illustrates the Delta T of the control cooling polymer fabric, and FIG. 4B illustrates the Delta T of the new cooling material. The new cooling material performed better, reaching a larger Delta T while keeping an extended cooling beyond the control cooling polymer fabric.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

We claim the following:

1. A cooling material for use with an assembled bodywear, comprising:
    a base fabric having a high wicking rate and having a performance characteristic; and
    a plurality of discontinuous absorbent polymer elements, each element consisting of a plurality of absorbent polymers that non-endothermically absorb water or another fluid, the plurality of discontinuous absorbent polymer elements attached to a body-facing side of the base fabric which is an innermost surface of the assembled bodywear, wherein the plurality of discontinuous absorbent polymer elements contact skin of a wearer when the assembled bodywear is worn, wherein the plurality of discontinuous absorbent polymer elements absorb about 3%-20% moisture by weight at 30° C. and 80% humidity, wherein fibers of the base fabric are less absorbent than the plurality of discontinuous absorbent polymer elements to form an absorption gradient to provide cooling by enhancing evaporative cooling of the cooling material, wherein a percentage of surface area coverage of the plurality of discontinuous absorbent polymer elements is from about 5% to about 50%, and wherein a placement and spacing of the plurality of discontinuous absorbent polymer elements leaves a portion of the base fabric uncovered by the plurality of discontinuous absorbent polymer elements and enables the base fabric to retain at least partial performance of the performance characteristic.

2. The cooling material of claim 1, wherein the plurality of discontinuous absorbent polymer elements are at least two times more absorbent than fibers of the base fabric.

3. The cooling material of claim 2, wherein the plurality of discontinuous absorbent polymer elements are at least ten times more absorbent than fibers of the base fabric.

4. The cooling material of claim 3, wherein the plurality of discontinuous absorbent polymer elements are at least fifty times more absorbent than fibers of the base fabric.

5. The cooling material of claim 1, wherein fibers of the base fabric absorb no more than 1.5% moisture by weight at 30° C. and 80% humidity.

6. The cooling material of claim 1, wherein fibers of the base fabric absorb no more than 0.8% moisture by weight at 30° C. and 80% humidity.

7. The cooling material of claim 1, wherein the base fabric has a wicking rate of greater than 3 inches in 10 minutes as defined by a Vertical Wick Test (AATCC 197).

8. The cooling material of claim 1, wherein the plurality of discontinuous absorbent polymer elements have an enthalpy of less than 10 J g$^{-1}$ as measured by differential scanning calorimetry (DSC) upon absorbing water or another fluid.

9. An article of bodywear comprising a cooling material, the cooling material comprising:
    a base fabric having a high wicking rate; and
    a plurality of discontinuous absorbent polymer elements, each element consisting of a plurality of absorbent polymers that non-endothermically absorb water or another fluid, the plurality of discontinuous absorbent polymer elements attached to a body-facing side of the base fabric which is an innermost surface of the article of bodywear, wherein the plurality of discontinuous absorbent polymer elements contact skin of a wearer when the article of bodywear is worn, wherein the plurality of discontinuous absorbent polymer elements are at least four times more absorbent than fibers of the base fabric to form an absorption gradient to provide cooling by enhancing evaporative cooling of the cooling material, wherein a percentage of surface area coverage of the plurality of discontinuous absorbent polymer elements is from about 5% to about 50%.

10. The article of bodywear of claim 9, wherein the plurality of discontinuous absorbent polymer elements absorb about 3.0%-20% moisture by weight at 30° C. and 80% humidity.

11. A method of making a cooling material, comprising:
    selecting a base fabric having a high wicking rate and low absorbance, and having a performance characteristic; and
    attaching a plurality of discontinuous absorbent polymer elements on a body-facing side of the base fabric which is an innermost surface of assembled bodywear when the assembled bodywear is worn, wherein each element consists of a plurality of absorbent polymers that non-endothermically absorb water or another fluid, wherein the plurality of discontinuous absorbent polymer elements absorb about 3%-20% moisture by weight at 30° C. and 80% humidity, wherein fibers of the base fabric are less absorbent than the plurality of discontinuous absorbent polymer elements to form an absorption gradient to provide cooling by enhancing evaporative cooling of the cooling material, wherein a percentage of surface area coverage of the plurality of discontinuous absorbent polymer elements is from about 5% to about 50%, and wherein the placement and spacing of the plurality of discontinuous absorbent polymer elements enables the base fabric to retain partial performance of the performance characteristic.

12. The method of claim 11, wherein the plurality of discontinuous absorbent polymer elements are at least two times more absorbent than fibers of the base fabric.

13. The method of claim 12, wherein the plurality of discontinuous absorbent polymer elements are at least ten times more absorbent than fibers of the base fabric.

14. The method of claim 11, wherein fibers of the base fabric absorb no more than 1.5% moisture by weight at 30° C. and 80% humidity.

15. The article of bodywear of claim 9, wherein the plurality of discontinuous absorbent polymer elements have an enthalpy of less than 10 J g$^{-1}$ as measured by differential scanning calorimetry (DSC) upon absorbing water or another fluid.

16. The article of bodywear of claim 9, wherein the plurality of discontinuous absorbent polymer elements are at least two times more absorbent than fibers of the base fabric.

17. The article of bodywear of claim 9, wherein fibers of the base fabric absorb no more than 1.5% moisture by weight at 30° C. and 80% humidity.

18. The method of claim 11, wherein the plurality of discontinuous absorbent polymer elements have an enthalpy of less than 10 J g$^{-1}$ as measured by differential scanning calorimetry (DSC) upon absorbing water or another fluid.

\* \* \* \* \*